Patented Sept. 18, 1923.

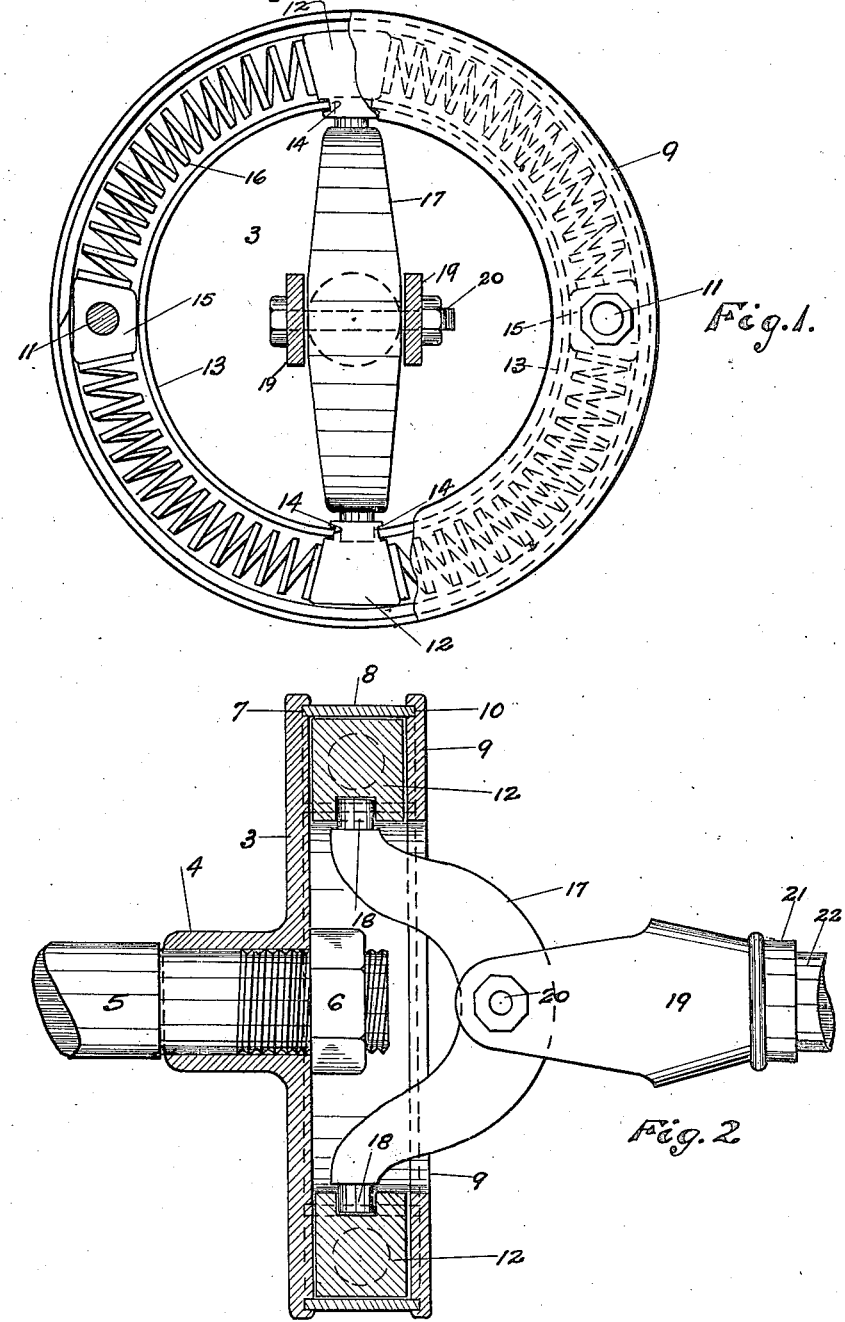

1,468,189

UNITED STATES PATENT OFFICE.

WALTER R. WOODS, OF CHICAGO, ILLINOIS, ASSIGNOR, BY MESNE ASSIGNMENTS, TO WILLIAM MUTSCHLER, TRUSTEE, OF GOSHEN, INDIANA.

UNIVERSAL JOINT.

Application filed June 11, 1920, Serial No. 338,206. Renewed February 7, 1923.

*To all whom it may concern:*

Be it known that I, WALTER R. WOODS, a citizen of the United States, and a resident of the city of Chicago, county of Cook, and State of Illinois, have invented certain new and useful Improvements in Universal Joints, of which the following is a specification.

My invention relates to improvements in universal joints for power shafts of power driven vehicles, such as automobiles, motorcycles, and the like, and has for its object the provision of an improved construction of this character, arranged and adapted to prevent sudden jars and shocks in the application of the power, and which is of simple construction, efficient in operation, and capable of econimical manufacture.

Other objects will appear hereinafter.

The invention consists in the combinations and arrangements of parts hereinafter described and claimed.

The invention will be best understood by reference to the accompanying drawings forming a part of this specification, and in which, Fig. 1, is a face view, shown partially in section, of a joint embodying the invention, and Fig. 2, a transverse section of the same.

The preferred form of construction, as illustrated in the drawings, comprises a plate 3 having a central hub 4 fitted over the end of a shaft section 5, and secured thereto by nut 6, thus effecting a rigid connection between said shaft section and the plate 3. The plate 3 is provided with an annular groove 7 near its periphery, and a split band 8 is arranged with one edge seated in said groove. The other edge of the band 8 is supported by a ring 9 having an annular groove 10 fitting the other edge thereof, thus forming an annular casing on the end of the shaft section 5 which is closed on three sides, but open on its inner side, as indicated. The ring 9 is held in place by two bolts 11 positioned diametrically with respect to each other.

Supporting blocks 12 are mounted within this annular casing to move freely in either direction around the inner periphery thereof, said blocks being connected together by half circular rings 13 seating in notches 14 in said blocks as shown, and whereby said blocks will be compelled to move in unison with each other. Abutment blocks 15 are mounted on the bolts 11 and thus are positioned diametrically with respect to each other, and on a diameter substantially at right angles to the normal diameter of blocks 12. Compression springs 16 are arranged in the casing with their ends seated on the blocks 12 and 15 as shown, there being four of the springs 16, and said springs serving to yieldingly resist angular movements of the blocks 12.

A yoke 17 is provided at its ends with trunnions 18 fitting loosely in suitable sockets provided in the blocks 12, said yoke spanning the nut 6 and passing freely through the opening in ring 9. A joint member 19 is pivoted to the yoke 17 by means of a bolt 20 passing therethrough at substantially right angles to the axis of the trunnions 18, and, with the yoke 17 constituting a universal joint. The member 19 is provided with a socket 21 rigidly attached to the end of another shaft section 22 arranged opposite the shaft section 5. By this arrangement, it will be observed, that, upon application of power to one of the shaft sections, said power will be transmitted to the other shaft section through the medium of the springs 16, thus effecting tortionally yielding connection between said shafts, which tends to lessen the shocks and jars incident to the application of power, as in automobiles, motorcycles, and the like, and tending to increase the smoothness with which said vehicles may be operated, and also tending to prevent stripping the gears of the transmission therein. The specific form and arrangement of the parts is a simple and effective one for the purpose, which may be readily taken apart and assembled, when desired, and which is capable of economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A universal joint for power shafts of power driven vehicles comprising a casing; angularly movable diametrically positioned supporting blocks in said casing; springs resisting movements of said blocks; a yoke pivotally mounted on said blocks; a joint member pivoted to said yoke on an axis substantially at right angles to the pivot axis thereof; and means for attaching a shaft section to said joint member, substantially as described.

2. A universal joint for power shafts of power driven vehicles comprising a circular casing having provision for attachment to a shaft section; two diametrically positioned supporting blocks mounted in said casing to move freely in either direction along the internal circumference thereof; substantially half circular rings connecting said blocks compelling movement thereof in unison with each other; abutment blocks in said casing positioned diametrically with reference to each other and on a diameter at substantially right angles to that of said supporting blocks; compression springs positioned between said supporting and abutment blocks; and a universal joint having one joint member pivotally mounted on said supporting blocks and the other joint member provided with means for attachment to another shaft section, substantially as described.

3. A universal joint for power shafts of power driven vehicles comprising a circular casing having provision for attachment to a shaft section; two diametrically positioned supporting blocks mounted in said casing to move freely in either direction along the internal circumference thereof; substantially half circular rings connecting said blocks compelling movement thereof in unison with each other; abutment blocks in said casing positioned diametrically with reference to each other and on a diameter at substantially right angles to that of said supporting blocks; compression springs positioned between said supporting and abutment blocks; a yoke having trunnions at its ends pivotally mounted in said supporting blocks; a joint member pivoted to said yoke on an axis substantially at right angles to the axis of said trunnions; and means for attaching a shaft section to said joint member, substantially as described.

4. A universal joint for power shafts of power driven vehicles comprising a casing; angular movable diametrically positioned supporting blocks in said casing; notches provided in opposite sides of said blocks; substantially half-circular rings engaging said notches compelling movement of said blocks in unison with each other; and a joint member pivotally carried by said blocks substantially at right angles to said casing adapted to be attached to a shaft section, substantially as described.

5. In mechanism of the character described; a rotatable element having a guide arcuately disposed in a plane transverse to said element's axis and having a stop; a bearing block movable in the guide; a second rotatable element; a member intermediate said rotatable elements, rockable on the bearing block and on the second rotatable element on axes transverse to each other and to that of the first mentioned rotatable element; and a resilient cushion intermediate the bearing block and the stop.

6. In mechanism of the character described; a rotatable element having a guide arcuately disposed in a plane transverse to said element's axis and having a stop; a bearing block having an arcuate movement on said member concentric with the guide; a second rotatable element; a member intermediate said rotatable element, rockable on the bearing block and on the second rotatable element on axes transverse to each other and to that of the first mentioned rotatable element; and a resilient cushion intermediate the bearing block and the stop, which cushion is compressibly and expansively operable in the guide.

In testimony whereof I have signed my name to this specification in the presence of two subscribing witnesses.

WALTER R. WOODS.

Witnesses:
JOSHUA R. H. POTTS,
ROSE K. TRIB.